Dec. 26, 1950 H. H. SPILLMAN 2,535,609

PHONOGRAPH RECORD RACK AND SELECTOR

Filed Sept. 8, 1947 2 Sheets-Sheet 1

Inventor

Hal H. Spillman

By Clarence A. O'Brien and Harvey B. Jacobson

Attorneys

Dec. 26, 1950 H. H. SPILLMAN 2,535,609

PHONOGRAPH RECORD RACK AND SELECTOR

Filed Sept. 8, 1947 2 Sheets-Sheet 2

Inventor

Hal H. Spillman

By Clarence A. O'Brien and Harvey B. Jacobson

Attorneys

Patented Dec. 26, 1950

2,535,609

UNITED STATES PATENT OFFICE 2,535,609

PHONOGRAPH RECORD RACK AND SELECTOR

Hal H. Spillman, Wichita, Kans.

Application September 8, 1947, Serial No. 772,731

6 Claims. (Cl. 312—19)

The present invention relates to new and useful improvements in racks for holding a number of phonograph records and embodying means whereby a desired record may be easily and quickly selected and removed from the rack.

An important object of the present invention is to provide novel indexing means to facilitate the speedy location of a desired record.

Another object of the invention is to provide a closed rack for the records and including a hinged lid or cover together with means operable by an opening movement of the lid to eject a selected record into a convenient position for removing the same from the rack.

A still further object of the invention is to provide means for returning a record to the rack in a proper position with respect to the indexing thereof and without regard as to the direction in which the recordings on the opposite sides of the record are facing.

A still further object is to provide an apparatus of this character of simple and practical construction, which is neat and attractive in appearance, efficient and reliable in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
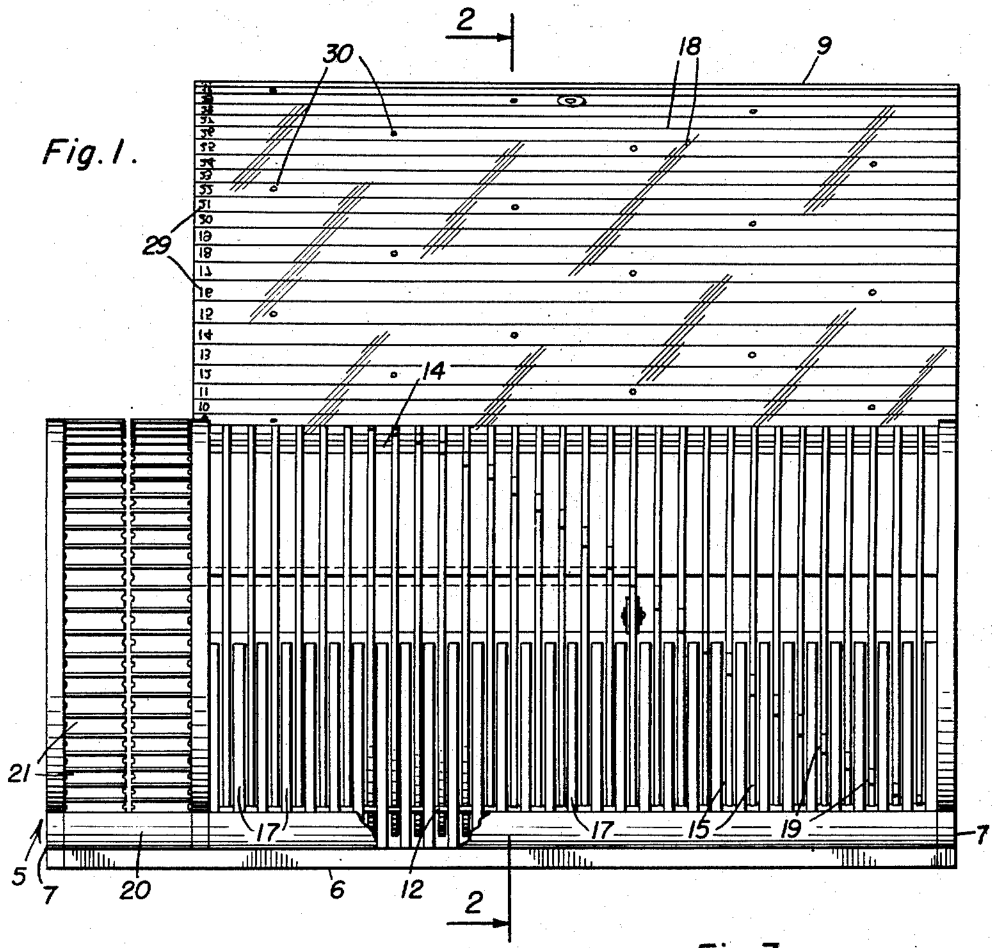
Figure 1 is a front elevational view with the lid or cover in a raised position.
Figure 4:
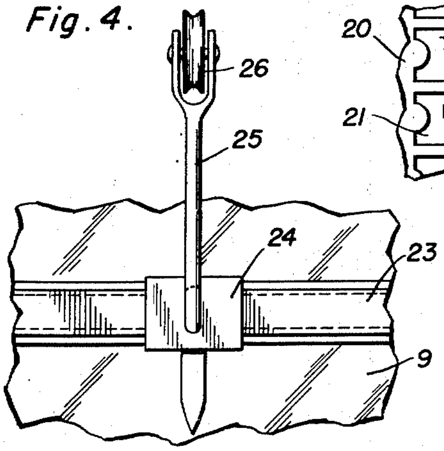
Figure 4 is an enlarged detail of the record selecting ejector carried by the cover.
Figure 7:
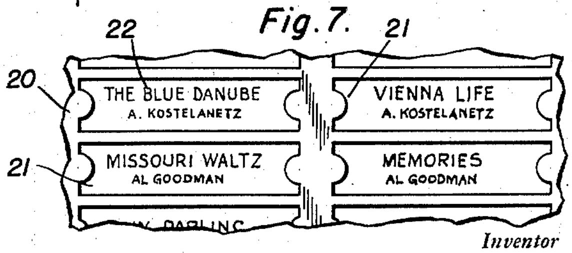
Figure 7 is an enlarged fragmentary plan view of the indexing label carried by the rack.

Referring now to the drawings in detail wherein for the purpose of illustration I have disclosed a preferred embodiment of the invention, the numeral 5 represents the rack generally and which includes a base 6, end walls 7 and a back wall 8 having its upper portion curved forwardly to the radius of a phonograph record to be mounted in the rack. A substantially semi-cylindrical cover 9 likewise curved to the radius of a phonograph record is hinged at one edge to the upper edge of the back 8 by a conventional hinge structure 10, the cover being swingable vertically into and out of position at the front of the rack.

The front edge of the base 6 is provided with a rearwardly inclined lip 11 at the upper edge of which is suitably supported a horizontal rod 12 which extends entirely across the open front of the rack at the lower portion thereof. A rear horizontal rod 13 also extends longitudinally of the rack and an upper horizontal rod 14 extends longitudinally of the rack immediately adjacent the hinged edge of the cover 9.

Figures 2, 3, 5, 6:
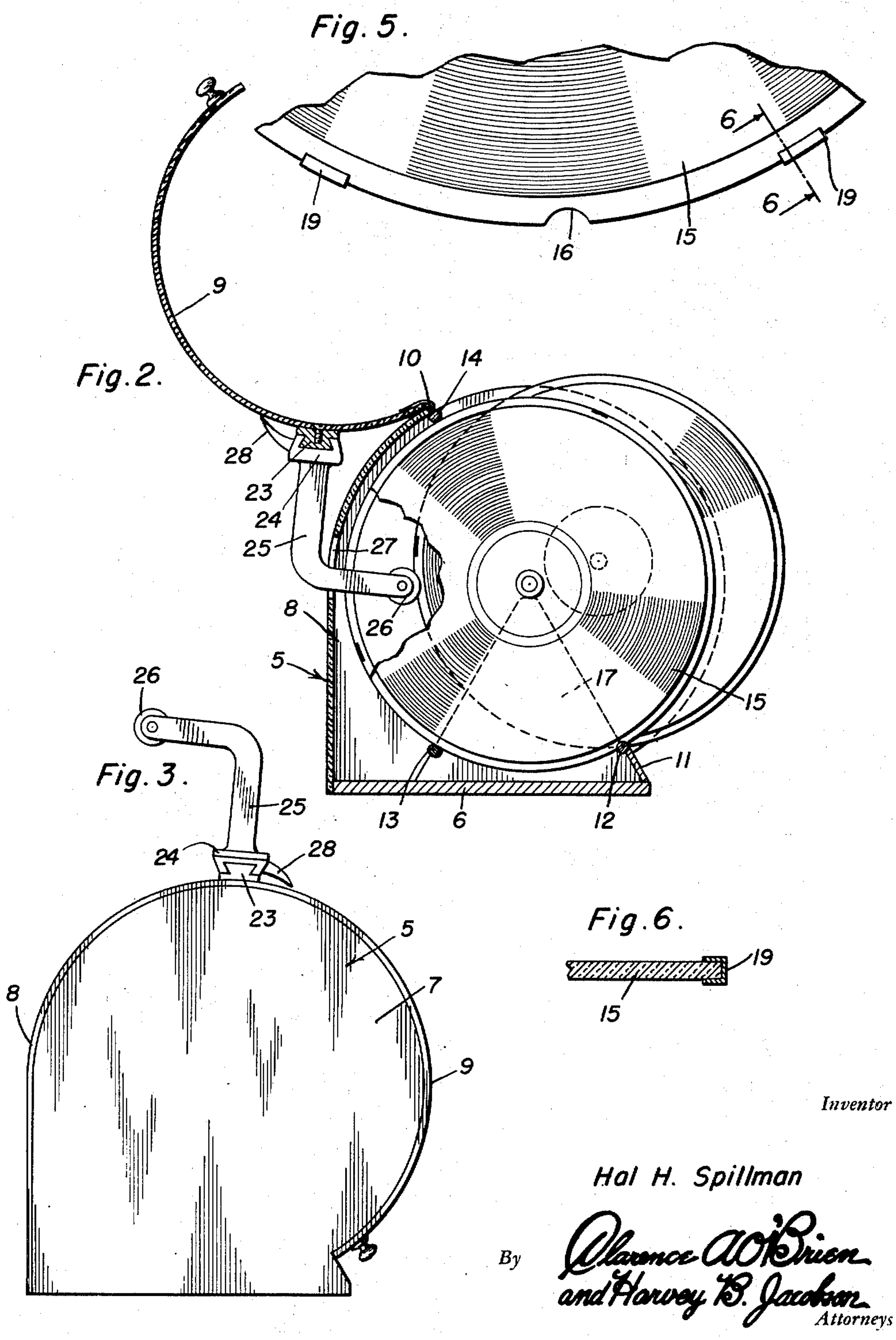
Figure 2 is a transverse sectional view taken on a line 2—2 of Figure 1.
Figure 3 is an end elevational view with the cover closed.
Figure 5 is an enlarged fragmentary plan view of a record and showing the positioning and identification means carried at the edge thereof.
Figure 6 is an enlarged fragmentary sectional view taken on the line 6—6 of Figure 5.

The rods 12 and 14 define the lower and upper edges of the open front of the rack and are spaced from each other a distance slightly less than the diameter of a phonograph record 15 to be supported in an upright position on the rods 12 and 13. The edge of the record is formed with a semi-circular notch 16 for receiving the rod 12 and which, when seated on the rod will enable the record to properly enter the rack with its rear lower edge resting on the rod 13 and with its upper edge positioned against the rod 14 as shown in Figure 2 of the drawings.

The rack 5 is constructed to hold a predetermined number of the records 15 and with upstanding separators 17 rising from the base 6 and positioned between adjacent records.

The cover 9 is constructed of a transparent material and is provided with equally spaced apart horizontal lines 18 extending throughout the length of the cover and between each pair of which a marker 19 carried at the edge of the record 15 is centered. A pair of the markers 19 are carried by each record and spaced equi-distantly from the notch 16 as shown in Figure 5 of the drawings and the markers for the several records may be painted of contrasting colors or a clip of suitable material frictionally held to the edge of the record as shown in Figure 6, or may be formed or constructed in any other suitable manner. The makers 19 of the several records are staggered with respect to each other as shown in Figure 1 of the drawings and either of the markers of each individual record will be uniformly positioned at the front of the rack regardless of the direction in which the recording on the record faces.

One end of the rack, beyond the cover 9, is provided with a front wall 20 which extends over the top of the rack to merge with the back 8 and to the outer surface of which is suitably secured a double column of labels 21, the labels opposite to each other bearing the title of the recordings on the opposite sides of the record as shown at 22.

To the outer surface of the cover 9 adjacent its hinged edge is suitably secured a longitudinally extending track 23 of dove-tailed construction in cross section and on which a complementary shaped slide 24 is suitably mounted and from which an angular arm 25 projects. A channeled roller 26 is journaled at the free end of the arm 25 and is arranged upon an opening movement of the cover 9 to enter an opening 27 in the back 8 of the rack to engage the rear edge of one of the records 15 to eject the record into a position with its front edge projecting slightly outwardly beyond the edges of the remaining records to facilitate grasping of the ejected record and removing the same from the rack.

A pointer 28 is also carried by the slide 24 and which is movable horizontally along the outer surface of the cover 9 opposite a selected record to be ejected.

In the operation of the device the rack 5 is filled with the records 15 by placing the notch 16 at the edge of each record on the rod 12 whereby the record may be moved rearwardly in the rack to rest on the rod 13 and against the rod 14. The markers 19 are then positioned in the horizontal plane of the labels 21 which carry the titles of the recordings on the opposite sides of the respective records.

When the cover 9 is closed the horizontal lines 18 carried by the cover will facilitate the location of a record selected from the titles 22 by following the lines 18 horizontally across the cover until the marking 19 is reached.

The indicator 28 is then moved horizontally along the cover into alinement with the record and upon an opening movement of the cover the arm 25 will be projected into the opening 27 at the back of the cover so that the roller 26 engages the rear edge of the record to eject the record forwardly into the position as shown in Figure 2. The selected record may then be easily removed from the rack.

The cover 9, preferably at its edge, adjacent the labels 21, is numbered as shown at 29 to provide a numbered listing of the records to facilitate location of the titles appearing on the labels for subsequent selection of the corresponding record from the rack.

The cover is also provided with openings 30 suitably dispersed between the lines 18 and alined with the edges of the record placed in the rack. The openings 30 are used for marking new records placed in the rack. This is done by notching the new record with the notch 16 at any point of its circumference and placing the record in the rack with the rod 12 seated in the notch. A pencil or tool is then inserted in one of the openings 30 to mark the edge of the record which is then removed and a permanent indexing element 19 is then fixed to the marked edge of the record. The record is reversed and replaced to repeat the marking so that the pair of indexing elements will be positioned equal distances from the notch.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a phonograph record rack, means supporting a plurality of records in upright position in the rack, and coacting indexing means between the records and the rack including identification means carried at the peripheral edge of the records and staggered in spiral formation, said means first mentioned interlocking with the edges of the records to releasably hold the same against rotation with the identification means in spiral form.

2. In a combined phonograph record rack and record selector, means supporting a plurality of records in upright position in the rack, identification means carried at the edges of the records, a hinged cover for the rack, and record ejecting means carried by the cover and operable upon an opening movement of the cover to eject a record from the rack selected by said identification means.

3. In a combined phonograph record rack and record selector, means supporting a plurality of records in upright position in the rack, identification means carried at the edges of the records, a hinged cover for the rack, and record ejecting means carried by the cover and operable upon an opening movement of the cover to eject a record from the rack selected by said identification means, said ejecting means comprising a horizontally slidable arm having a free end movable into position for engaging the rear edge of a record to be ejected.

4. In a phonograph record rack having an open front, a horizontal rod supported in the rack, means supporting a plurality of records in an upright position in the rack, each of said records having a notch in the edge thereof seating the rod therein, and indexing means for the records and including a pair of identification elements carried at the edge of each record and arranged at equally spaced distances oppositely from the notch.

5. In a phonograph record rack having an open front for receiving a plurality of records, upper and lower horizontal rods carried at the open front, said rods being spaced from each other a distance less than the diameter of records placed in the rack, a notch in the edge of each record for seating one of the rods therein to pass the records between the rods into a position in the rack, identification means carried at the edge of each record in a staggered relation with respect to the identification means of the remaining records, and a listing of the records carried by the rack with the items thereof alined with the identification means of the corresponding records.

6. In a phonograph record rack, means supporting a plurality of records in upright position in the rack, indexing means for the records including a listing of titles at one end of the rack, and a transparent cover on the rack for the records and having openings therein alined with the edges of the records and with the titles of the listing for receiving an implement to mark the edges of the records at a point determined by the order of titles in the listing, said cover also having horizontally arranged lines extending from the listing across the edges of the records and between the openings to identify the openings with the titles of the listing.

HAL H. SPILLMAN.

REFERENCES CITED

The following references are of record in the file of this patent:

UNITED STATES PATENTS

| Number | Name | Date |
|---|---|---|
| 235,090 | Kletzker | Dec. 7, 1880 |
| 237,241 | Brower | Feb. 1, 1881 |
| 1,246,310 | Niswanger | Nov. 13, 1917 |
| 1,376,703 | Kimmel | May 3, 1921 |
| 1,424,779 | Sea | Aug. 8, 1922 |
| 1,499,159 | Elder | June 24, 1924 |

FOREIGN PATENTS

| Number | Country | Date |
|---|---|---|
| 399,187 | Great Britain | Oct. 2, 1933 |